United States Patent
Koganezawa

(10) Patent No.: US 7,554,625 B2
(45) Date of Patent: Jun. 30, 2009

(54) DISPLAY DEVICE AND BACKLIGHT DEVICE HAVING PLURAL SOLID-STATE EMITTING ELEMENT UNITS EACH EMITTING AT LEAST THREE COLORS AND CONTAINED WITHIN A CYLINDRICAL AIR-FILLED LIGHT GUIDE BODY ALSO SURROUNDED BY AIR

(75) Inventor: Nobuyuki Koganezawa, Chiba (JP)

(73) Assignees: Hitachi Displays, Ltd., Mobara-Shi (JP); Hitachi Displays Devices, Ltd., Mobara-Shi (JP)

( * ) Notice: Subject to any disclaimer, the term of this patent is extended or adjusted under 35 U.S.C. 154(b) by 183 days.

(21) Appl. No.: 11/135,295

(22) Filed: May 24, 2005

(65) Prior Publication Data

US 2005/0259195 A1 Nov. 24, 2005

(30) Foreign Application Priority Data

May 24, 2004 (JP) ............................. 2004-153182

(51) Int. Cl.
*G02F 1/1335* (2006.01)
(52) U.S. Cl. ............................. 349/61; 349/62; 349/64; 349/67; 349/160; 362/555; 362/612
(58) Field of Classification Search .................. 349/61, 349/62, 64, 67, 159, 160; 362/555, 612
See application file for complete search history.

(56) References Cited

U.S. PATENT DOCUMENTS

| | | | |
|---|---|---|---|
| 6,404,131 B1 * | 6/2002 | Kawano et al. ................ 315/82 |
| 6,679,621 B2 * | 1/2004 | West et al. .................... 362/327 |
| 6,864,627 B2 * | 3/2005 | Komoto et al. ............... 313/503 |
| 7,072,096 B2 * | 7/2006 | Holman et al. ............... 359/298 |
| 2002/0071288 A1 * | 6/2002 | Lim ............................. 362/558 |
| 2002/0097354 A1 * | 7/2002 | Greiner ......................... 349/61 |
| 2003/0235050 A1 * | 12/2003 | West et al. .................... 362/327 |
| 2005/0001537 A1 * | 1/2005 | West et al. .................... 313/500 |
| 2005/0243243 A1 * | 11/2005 | Koganezawa ................. 349/62 |

* cited by examiner

*Primary Examiner*—David Nelms
*Assistant Examiner*—John Heyman
(74) *Attorney, Agent, or Firm*—Antonelli, Terry, Stout & Kraus, LLP.

(57) ABSTRACT

A backlight device, which uses solid-state light emitting elements capable of emitting lights of three colors, consisting of red, green and blue, can exhibit an enhanced light utilizing efficiency, and can generate light of high uniformity in brightness and chromaticity in a display device which can obtain a display image of high brightness with a rapid response speed. The backlight device includes a reflector which has a light reflection surface, a plurality of light transmitting cylindrical light guide bodies which are mounted on the light reflection surface of the reflector in a uniformly distributed manner, and light emitting diodes capable of emitting lights of at least three colors which are mounted inside each light guide body. By performing color mixing every light guide block, it is possible to obtain a white light of high chromaticity which has a high luminous flux distribution.

20 Claims, 8 Drawing Sheets

US 7,554,625 B2

DISPLAY DEVICE AND BACKLIGHT DEVICE HAVING PLURAL SOLID-STATE EMITTING ELEMENT UNITS EACH EMITTING AT LEAST THREE COLORS AND CONTAINED WITHIN A CYLINDRICAL AIR-FILLED LIGHT GUIDE BODY ALSO SURROUNDED BY AIR

CROSS-REFERENCE TO RELATED APPLICATIONS

The disclosure of Japanese Patent Application No. 2004-153182, filed on May 24, 2004, including the specification, drawings and abstract, thereof is incorporated herein by reference in its entirety.

BACKGROUND OF THE INVENTION

The present invention relates in general to a backlight device and to a display device which uses the backlight device; and, more particularly the present invention relates to a direct backlight device, which is arranged on a back surface side of a display device, and which uses solid-light-emitting-elements (LED) represented by light emitting diodes that are capable of emitting light in three colors, consisting of red, green and blue, to irradiate a light source light to the display device.

Recently, as a backlight which is used for a large-sized liquid crystal television set, a large-sized liquid crystal monitor or the like, a cold cathode fluorescent lamp has been popularly used. The backlight device which uses a cold cathode fluorescent lamp is roughly classified into a side-edge-type backlight device, in which the cold cathode fluorescent lamp is arranged on a side of a light guide body, and a direct-type backlight device, in which a plurality of cold cathode fluorescent lamps are arranged in parallel on a back surface of a liquid crystal display panel, without providing a light guide body on the back surface of the liquid crystal display panel.

While the side-edge type backlight device has the advantage that it can have a relatively compact structure, the side-edge type backlight device has a drawback in that the light utilizing efficiency is low. On the other hand, while it has a high light utilizing efficiency, the direct backlight device has a large thickness. In place of the backlight device which uses such a cold cathode fluorescent lamp as a light source, recently, a backlight device, which uses a solid-state light emitting element (LED) represented by a light emitting diode which exhibits a high color reproducibility and a rapid responsive speed and which uses no mercury, so as to satisfy the demand for preservation of the environment, has been studied and developed by concerned companies.

Recently, a light emitting diode which is capable of emitting light in three colors consisting of red, green and blue and a light emitting diode capable of emitting white light have been developed. With respect to the light emitting diode which is used as a light source of a backlight device, since it is desirable to irradiate a white light to a display panel eventually, the use of a light emitting diode that is capable of emitting white light has been considered. However, a white light emitting diode which irradiates white light obtains the white light by converting the color emitted from the blue-light light emitting diode or the ultraviolet-light light emitting diode into white light using phosphors; and, hence, there arises a drawback in that the white color light emitting diode exhibits a poor color rendering and narrows the range of color reproducibility.

On the other hand, the light emitting diodes that are capable of emitting light of three colors, consisting of red, green and blue, are superior to the white light emitting diode with respect to the point that the three-color-light-emitting light emitting diode can obtain a wide range of color reproducibility and with respect to the point that, by changing the current quantity of the light emitting diodes that are capable of emitting light of three colors, consisting of red, green and blue, the chromaticity of the backlight can be freely changed. From this viewpoint, it is preferable to use the light emitting diodes that are capable of emitting light of three colors, consisting of red, green and blue, at this stage.

With respect to the constitution of the light-emitting-diode direct backlight device which uses light emitting diodes that are capable of emitting light of three colors, consisting of red, green and blue, as a light source, such light emitting diodes may be arranged on a back surface of the display panel, and this constitution is shown in FIG. 10, which is a developed perspective view. As shown in FIG. 10, on a back surface of the liquid crystal display panel, for example, there are a plurality of light emitting diode substrates LEDP on which light emitting diodes LEDR, LEDG, LEDB, that are capable of emitting three colors of light, consisting of red, green and blue, are arranged. Further, a reflector REF is arranged on back surfaces of the light emitting diode substrates LEDP, and side reflectors REF1, REF2, REF3, REF4 are arranged on side-surface sides of the light emitting diode substrates LEDP.

Further, an optical compensation sheet stacked body OPS is arranged above the light emitting diode substrates LEDP by way of an air layer ARL, wherein the optical compensation sheet stacked body OPS is formed by stacking a first diffusion sheet DF1, a first prism sheet PRZ1, a second prism sheet PRZ2 and a second diffusion sheet DF2 in this order from the light emitting diode substrates LEDP side. Further, between this optical compensation sheet stacked body OPS and the light emitting diode substrates LEDP, on which the light emitting diodes LED are mounted, an air layer ARL which has a relatively large layer thickness is arranged.

In the backlight device having such a constitution, lights having plural colors which are emitted from the light emitting diodes LED, which are capable of emitting light of three colors consisting of red, green and blue, which constitutes the light source, is subjected to color mixing using the air layer ARL, the reflector REF and the side reflectors REF1 to REF4; and, thereafter, the light is irradiated to the back surface of the liquid crystal display panel PNL, which constitutes the display panel.

Further, in the backlight device having such a constitution, the arrangement of the light emitting diodes that are capable of emitting light of three colors, consisting of red, green and blue, as shown in a plan view of FIG. 11, adopts a structure in which there is a light emitting diode substrate LEDP on which the light emitting diodes LEDR, LEDG, LEDG, LEDB are arranged in the order of LEDR, LEDG, LEDG, LEDB in a row, which constitutes one unit, and a plurality of these units are arranged in parallel.

Here, in this case, to obtain a white mixture of light by taking the light emitting efficiencies of the light emitting diodes LEDR, LEDG, LEDB into consideration, it is preferable to set the numbers of the respective light emitting diodes LEDR, LEDG, LEDB that are capable of emitting light of respective colors to a ratio of red(R):green(G):blue(B)=1:2:1. Further, the light emitting diodes LEDR, LEDG, LEDB which are capable of emitting light of three colors are of the side emitting type, and, hence, these light emitting diodes exhibit an irradiation pattern as shown in FIG. 12. As shown in the drawing, the optical intensity assumes a peak value when an irradiation angle θ of the light L becomes θ=approximately ±80° and an angle θ which halves the optical intensity is ±20°. In such a constitution, with the use of a light source formed of side-emitting-type light emitting diodes LED, it is possible to allow the light to be incident efficiently on the display device, and, hence, the use of side-emitting-type light emitting diodes LED is extremely effective.

Here, for example, Japanese Patent Laid-Open No. 256817/2001 (literature 1) discloses that a surface light source which uses, as a light source, light emitting diodes LEDR, LEDG, LEDB that are capable of emitting light of three colors, consisting of red, green and blue, which constitute light emitting elements in a light guide body, exhibit a poor color mixing property and cannot mix a plurality of lights into a desired light color.

SUMMARY OF THE INVENTION

However, in the backlight device having such a constitution, the light source is constituted by arranging the light emitting diodes LED (LEDR, LEDG, LEDB) which are capable of emitting lights of three colors, consisting of red, green and blue, in a row, and, further, the optical path along which the lights irradiated from the light emitting diodes LED (LEDR, LEDG, LEDB) reach the bottom-surface reflector REF and the side reflectors REF1 to REF4 is formed of the air layer ARL. These constitute factors which deteriorate the uniformity of the brightness and chromaticity on the backlight illumination surface. That is, to produce a favorable color mixing, it is necessary to allow the air layer ARL formed between the light emitting diodes LED (LEDR, LEDG, LEDB) and the optical compensation sheet OPS to have a large thickness, so that it is impossible to obtain a long optical path length, thus giving rise to the drawback that the uniformity of the brightness and chromaticity is lowered.

Accordingly, the present invention has been made to overcome the above-mentioned drawbacks of the related art, and it is an object of the present invention to provide, in a direct backlight device which uses light emitting diodes capable of emitting light of three colors, consisting of red, green and blue, as a light source, a backlight device which can produce favorable color mixing by elongating the optical path length, thus providing a surface light source light which exhibits a high uniformity of brightness and chromaticity.

Further, it is another object of the present invention to provide a display device which exhibits a high color reproducibility and which can provide a display image having a high brightness with a rapid response speed even when a light-emitting-diode direct backlight device is used.

To achieve the above-mentioned objects, the backlight device according to the present invention includes a light reflection plate which has a light reflection surface, a plurality of light guide bodies which are formed of light-transmitting cylindrical bodies mounted on the light reflection surface in a uniformly dispersed manner, and solid-state light emitting elements, capable of emitting light of at least three colors, which are provided in the inside of the respective light guide bodies. Due to such a constitution, color mixing is performed for every light guide block on which the solid-state light emitting elements capable of emitting lights of three colors are arranged in the inside of each light guide body, and, hence, it is possible to obtain a uniform luminous flux distribution, thus overcoming the drawbacks of the related art.

Further, for the backlight device of the present invention, having the above-mentioned constitution, it is preferable to use a side-emitting-type solid-state light emitting element as the light emitting element. Due to such a constitution, it is possible to elongate the optical path length, and, hence, it is possible to obtain a surface light source light which exhibits a high uniformity in brightness and chromaticity.

Further, for the backlight device of the present invention, having the above-mentioned constitution, it is preferable to make the mounting heights of the solid-state light emitting elements different from each other. Due to such a constitution, it is possible to reduce the rate at which light irradiated from the solid-state light emitting element is absorbed by the neighboring solid-state light emitting elements, and, hence, the light utilizing efficiency can be enhanced.

Further, for the backlight device of the present invention, having the above-mentioned constitution, it is preferable to form a light incident surface which is inclined relative to a center axis on an inner wall surface of the light guide body. Due to such a constitution, it is possible to increase the incident light quantity which enters into the inside of the cylindrical light guide body, and, at the same time, it is possible to elongate the optical path length.

Further, for the backlight device of the present invention, having the above-mentioned constitution, it is preferable to integrally form an optical control element on an outer wall surface of the light guide body. Due to such a constitution, it is possible to elongate the optical path length in the inside of the light guide body.

Further, the display device according to the present invention includes a liquid crystal display panel which is constituted by interposing a liquid crystal layer between a pair of transparent substrates, which have electrodes for forming pixels on inner surfaces thereof, an optical compensation sheet stacked body which is mounted on a back surface of the liquid crystal display panel, and a backlight device having the above-mentioned constitution, which is mounted on a back surface of the optical compensation sheet stacked body. Due to such a constitution, since surface light source light which exhibits a high uniformity in brightness and chromaticity is irradiated to the back surface of the liquid crystal display panel from the backlight device, it is possible to realize an image display of high quality.

Further, the display device according to the present invention includes a display panel which performs an image display and a backlight device which is mounted on a back surface of the display panel, wherein the backlight device includes a light reflection plate which has a light reflection surface formed on a surface thereof, a plurality of light guide bodies which are formed of light-transmitting cylindrical bodies mounted on the light reflection surface in a uniformly dispersed manner, and solid-state light emitting elements capable of emitting light of at least three colors which are provided in the inside of the respective light guide bodies. Due to such a constitution, since surface light source light which exhibits a high uniformity in brightness and chromaticity is irradiated to the back surface of the display panel from the backlight device, it is possible to realize an image display of high quality.

Further, for the display device of the present invention, having the above-mentioned constitution, it is preferable to use a side-emitting-type solid-state light emitting element as the light emitting element. Due to such a constitution, surface light source light which exhibits a high uniformity in brightness and chromaticity is irradiated, and, hence, it is possible to obtain an image display of high quality.

Further, for the display device of the present invention, having the above-mentioned constitution, it is preferable to make the mounting heights of the solid-state light emitting elements different from each other. Due to such a constitution, surface light source light which exhibits a high uniformity in brightness and chromaticity is irradiated, and, hence, it is possible to obtain an image display of high quality.

Further, for the display device of the present invention, having the above-mentioned constitution, it is preferable to form a light incident surface which is inclined relative to a center axis on an inner wall surface of the light guide body. Due to such a constitution, surface light source light which exhibits a high uniformity in brightness and chromaticity is irradiated, and, hence, it is possible to obtain an image display of high quality.

Further, for the display device of the present invention, having the above-mentioned constitution, it is preferable to integrally form an optical control element on an outer wall surface of the light guide body. Due to such a constitution, surface light source light which exhibits a high uniformity in brightness and chromaticity is irradiated, and, hence, it is possible to obtain an image display of high quality.

The invention is not limited to the above-mentioned constitutions and various modifications can be made without departing from the technical concept of the invention.

By using the backlight device of the present invention, it is possible to elongate the optical path length, and, at the same time, it is possible to largely enhance the light utilizing efficiency; and, hence, it is possible to obtain surface light source light of high uniformity in brightness and chromaticity on the backlight illumination surface, whereby it is possible to obtain extremely excellent advantageous effects, including the realization of a solid-state-light-emitting-element direct backlight device capable of emitting three colors.

Further, by using the backlight device of the present invention, it is possible to obtain extremely excellent advantageous effects, including following advantageous effects. That is, compared to a cold cathode fluorescent lamp which uses mercury, it is possible to obtain surface light source light of high uniformity in brightness and chromaticity which is substantially equal to or greater than the uniformity in brightness and chromaticity of the cold cathode fluorescent lamp which uses mercury. Further, it is possible to realize a solid-state light-emitting-element direct backlight, that is capable of emitting light of three colors, which is free from mercury, and, hence, which satisfies a demand for preservation of the environment and is applicable to a large-sized display device.

Further, by using the display device of the present invention, it is also possible to obtain extremely excellent advantageous effects, including an effect that, since surface-light-source light having a high uniformity in brightness and chromaticity is radiated from a solid-state-light-emitting-element direct backlight device that is capable of emitting light of three colors, it is possible to obtain a display image which exhibits high color reproducibility, rapid response and high brightness.

BRIEF DESCRIPTION OF THE DRAWINGS

FIG. 2A and FIG. 2B are diagrams showing a constitutional example of a light guide body block of the backlight device shown in FIG. 1, wherein FIG. 2A is a plan view and FIG. 2B is a cross-sectional view taken along a line B-B' in FIG. 2A;

FIG. 7A and FIG. 7B are diagrams showing a constitutional example of an embodiment 4 of the backlight device according to the present invention, wherein FIG. 7A is a plan view and FIG. 7B is a cross-sectional view taken along a line B-B' in FIG. 7A;

DETAILED DESCRIPTION OF THE INVENTION

Hereinafter, various embodiments of a liquid crystal display device according to the present invention will be explained in conjunction with the accompanying drawings.

Embodiment 1

Figure 1:
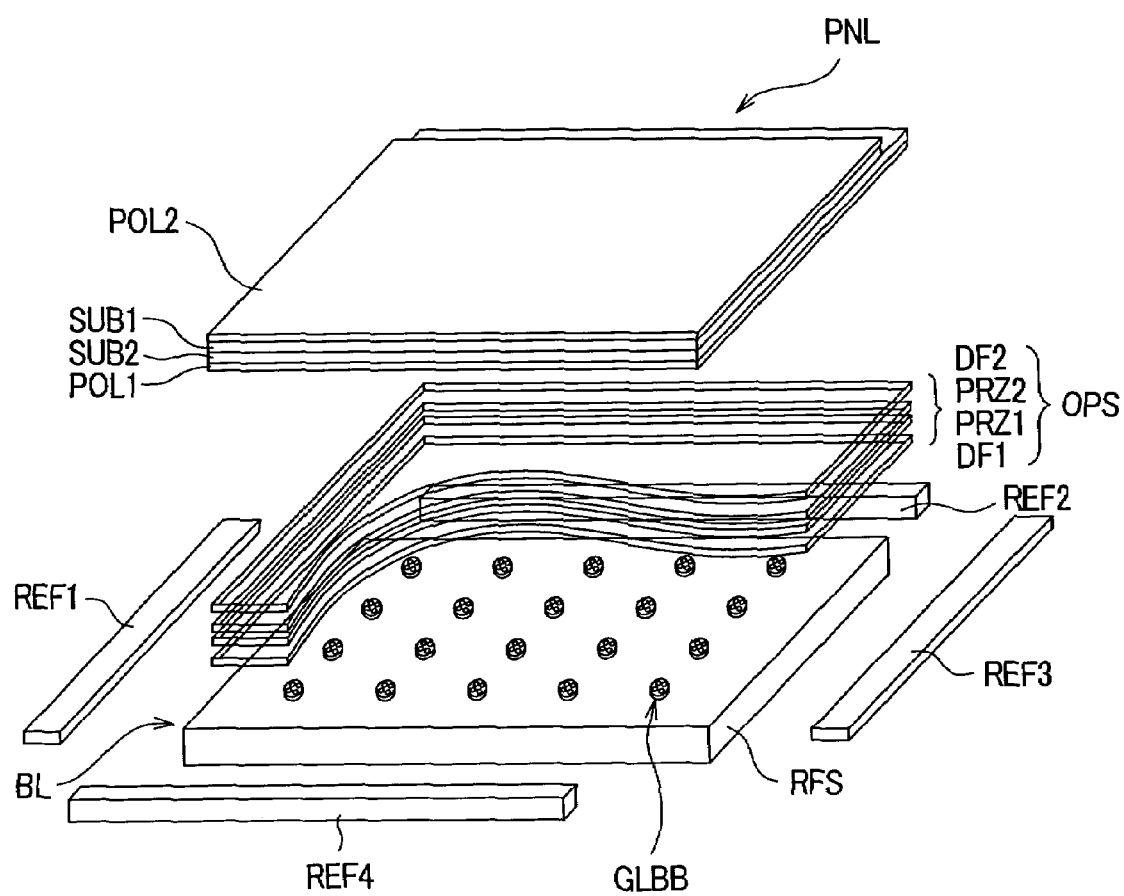
FIG. 1 is a developed perspective view showing the constitution according to an embodiment 1 of a liquid crystal display device having a solid-state-light-emitting-element direct backlight device representing a display device according to the present invention.

FIG. 1 is a developed perspective view showing the constitution of an embodiment 1 of a backlight device of the present invention and a liquid crystal display device having the backlight device. In FIG. 1, reference symbol PNL indicates a liquid crystal display panel which constitutes a display panel. In the liquid crystal display panel PNL, a liquid crystal layer is sandwiched between a first substrate SUB1 and a second substrate SUB2, each of which are formed of a light transmitting glass plate. The liquid crystal display panel PNL also includes electrodes, active elements or the like for forming pixels on an inner surface or inner surfaces of either one or both of the light-transmitting-glass first substrate SUB1 and/or second substrate SUB2. Here, the first substrate SUB1 on which the active elements, such as thin film transistors (TFT), are formed is referred to as an active matrix substrate, and can also be referred to as a TFT substrate.

Further, a first polarizer POL1 is stacked on a first main surface (backlight device side) by lamination or the like, while a second polarizer POL2 is stacked on a second main surface (display screen side) by lamination or the like. Further, on a back surface side of the liquid crystal display panel PNL, an optical compensation sheet stacked body OPS is mounted. The optical compensation sheet stacked body OPS is configured by stacking a first diffusion sheet DF1, a first prism sheet PRZ1, a second prism sheet PRZ2 and a second diffusion sheet DF2 in this order by lamination or the like from a side which faces a light guide body of the backlight device, which will be explained later.

Figure 2A:
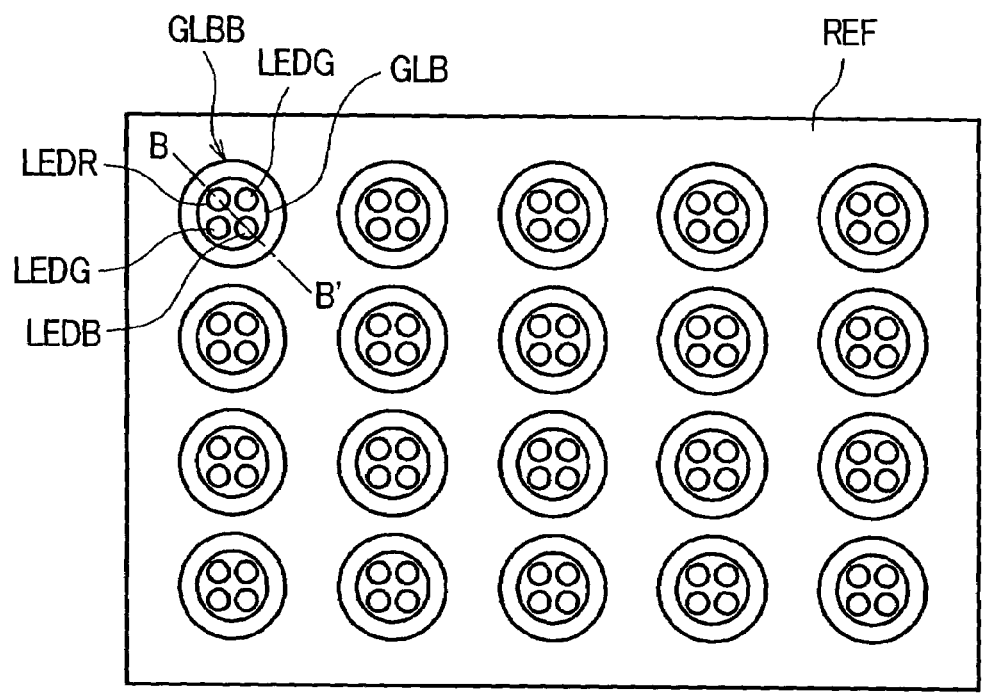

Further, on a back surface side of the optical compensation sheet stacked body OPS, the backlight device BL according to the present invention is mounted. The backlight device BL is configured as shown in FIG. 2A, for example. That is, a plurality of light guide bodies GLB, which are made of a light-transmitting acrylic resin material, for example, and are formed in a cylindrical shape, are uniformly mounted on a reflector REF made of an acrylic or polycarbonate-based white resin material, at a given interval by adhesion or the like. In the inside of each cylindrical light guide body GLB, four light emitting diodes in total, consisting of a light emitting diode LEDR capable of emitting red light, a first light emitting diode LEDG1 capable of emitting green light, a second light emitting diode LEDG2 capable of emitting green light, and a light emitting diode LEDB capable of emitting blue light, are arranged. That is, packaged light guide blocks GLBB are mounted on the reflector REF.

Here, the order of arrangement of these light emitting diodes LEDR, LEDG1, LEDG2, LEDB which are capable of emitting lights of three colors is not particularly limited. Further, a structure is adopted in which these light emitting diodes LEDR, LEDG1, LEDG2, LEDB are respectively electrically connected to a printed wiring circuit (not shown in the drawing) on a back surface side of the reflector REF and are eventually connected with a power source line.

Figure 2B:
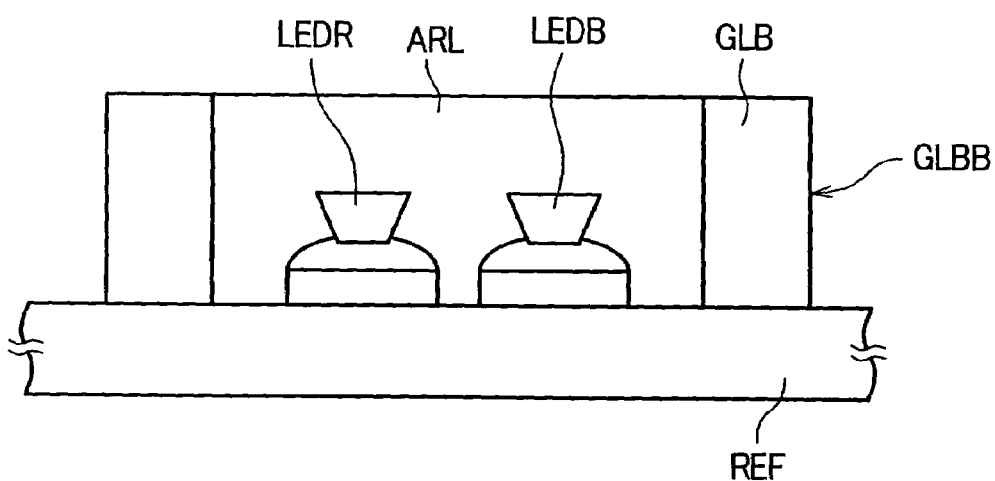

Here, all of the light emitting diodes LEDR, LEDG1, LEDG2, LEDB which are arranged in the inside of each cylindrical light guide body GLB are formed of a side-emitter-type light emitting diode and adopt a structure in which the light emitting diodes LEDR, LEDG1, LEDG2, LEDB are arranged in a state that these light emitting diodes are completely accommodated in an air layer ARL which is formed in the inside of each cylindrical light guide body GLB, as shown in FIG. 2B. Due to such a constitution, the lights of respective colors emitted from the light emitting diodes LEDR, LEDG1, LEDG2, LEDB are irradiated in a random manner to the inside of the air layer ARL, and color mixing is performed in the air layer ARL. That is, the color mixing is performed for every light guide body block GLBB, and a surface white light is irradiated with a uniform luminous flux distribution toward an upper illumination surface of the air layer ARL.

Further, the plurality of light guide body blocks GLBB, which are mounted on the reflector REF, are surrounded by side reflectors REF1, REF2, REF3 and REF4 that are made of an acrylic or polycarbonate-based white resin material, for example, and these reflections are mounted on peripheral portions of the reflector REF by adhesion or the like. These reflectors have a reflection function of diffusing and reflecting the light which has leaked from an outer wall surface of each light guide body block GLBB in the inner direction of the light guide body block GLBB.

In the backlight device BL having such a constitution, the lights of respective colors irradiated from the light emitting diodes LEDR, LEDG1, LEDG2, LEDB which are incident on the inside of the cylindrical light guide body GLBB are irradiated into the inside of the air layer ARL in a random manner. Accordingly, the rate of color mixing is increased; and, at the same time, due to the uniform arrangement of the respective light guide body blocks GLBB, the lights of respective colors are irradiated to the back light illumination surface (optical compensation sheet stacked body OPS side) with a uniform luminous flux distribution. That is, surface-light-source light having a high uniformity in chromaticity can be irradiated. The surface-irradiation light having a uniform luminous flux distribution is irradiated to the back surface of the liquid crystal display panel PNL through the optical compensation sheet stacked body OPS.

Figure 12:
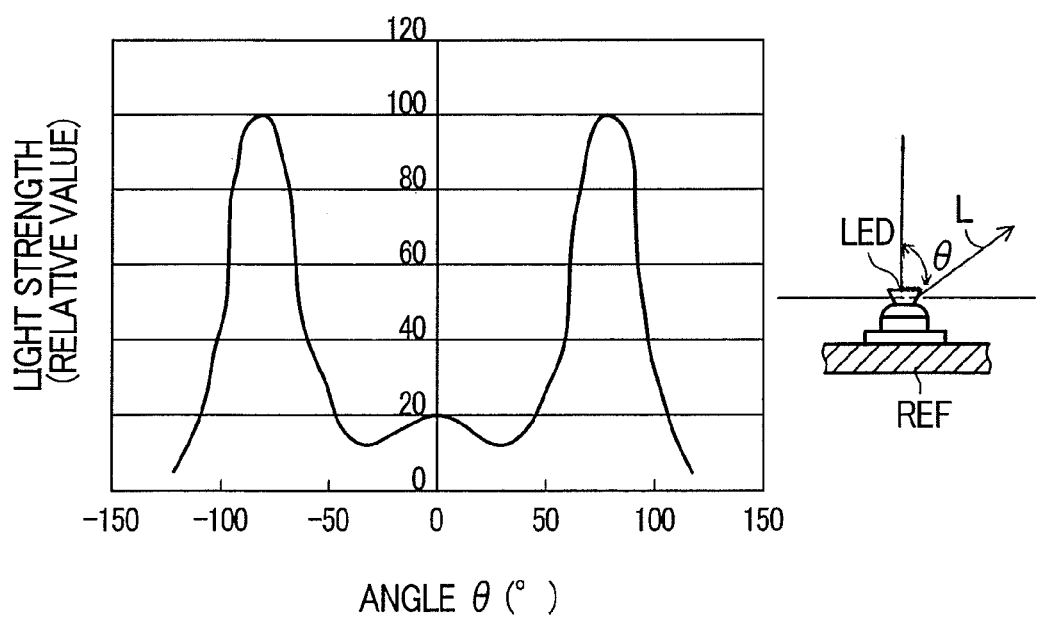
FIG. 12 is a graph showing the relationship between an irradiation angle and the intensity of irradiated light emitted from a side-emitter-type light emitting diode.

Further, in the backlight device BL having such a constitution, with the use of the side-emitter-type light emitting diodes LEDR, LEDG1, LEDG2, LEDB as the light emitting diodes, the irradiation pattern, as shown in FIG. 12, which has been explained previously, exhibits characteristics in which the light intensity is sharply attenuated while having light emission peaks when the irradiation angle θ falls within a range of 60° to 100° and a range of −60° to −100°.

That is, this irradiation pattern is such that most of the irradiation light is irradiated in just the lateral direction of the light emitting diodes LEDR, LEDG1, LEDG2, LEDB. In the constitution of the present invention, with the use of the side-emitter-type light emitting diodes LEDR, LEDG1, LEDG2, LEDB as the light source, it is possible to allow the emitted light to be efficiently incident on the inside of the cylindrical light guide body GLB, and, hence, the use of side-emitter-type light emitting diodes LEDR, LEDG1, LEDG2, LEDB is extremely effective.

Figure 3:
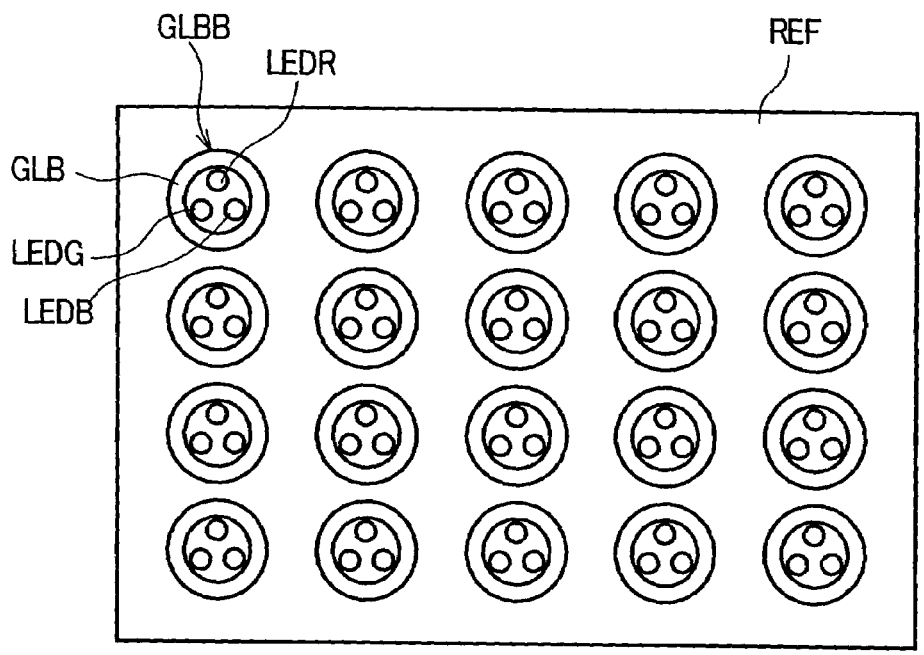
FIG. 3 is a plan view showing another constitutional example of the light guide body block of the backlight device according to the present invention.

FIG. 3 is a plan view showing another constitutional example of the backlight device according to the present invention. In the drawing, parts identical to the parts shown in FIG. 2A are given the same symbols, and a repeated explanation of these parts is omitted. A constitutional feature which makes the constitution shown in FIG. 3 different from the constitution shown in FIG. 2A lies in the fact that, when the light emitting efficiencies of the light emitting diodes that are capable of emitting lights of respective colors are enhanced, it is possible to set the number of light emitting diodes LEDR, LEDG, LEDB which are accommodated in the inside of each cylindrical light guide body GLB to a rate of red(R):green (G):blue(B)=1:1:1.

Figure 4:
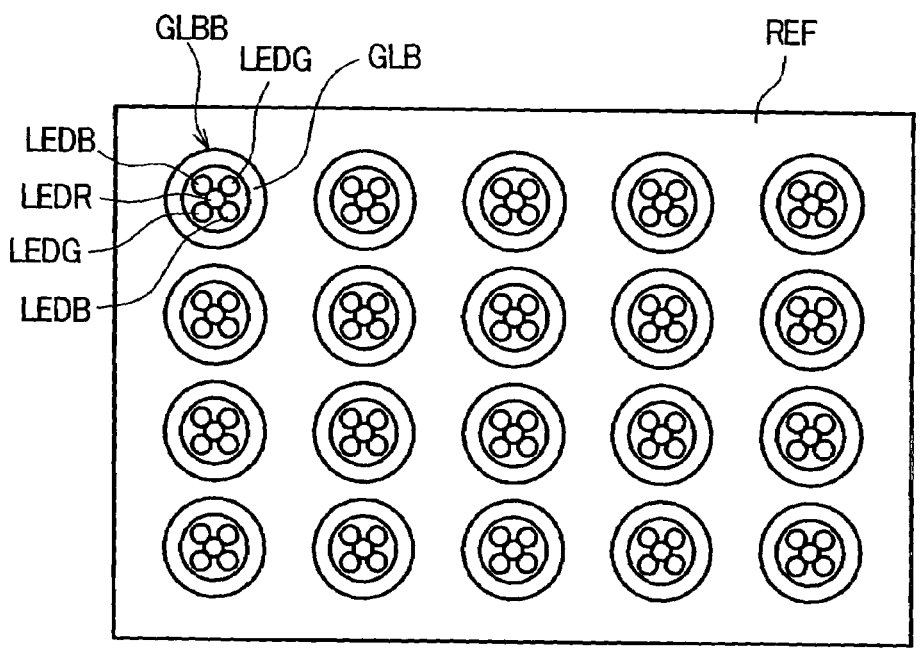
FIG. 4 is a plan view showing another constitutional example of the light guide body block of the backlight device according to the present invention.

FIG. 4 is a plan view showing still another constitutional example of the backlight device according to the present invention. In the drawing, parts identical to the parts shown in the above-mentioned FIG. 2A are given the same symbols, and a repeated explanation of these parts is omitted. A constitutional feature which makes the constitution shown in FIG. 4 different from the constitution shown in FIG. 2A lies in the fact that, when the light emitting efficiencies of the light emitting diodes that are capable of emitting lights of respective colors are further enhanced, it is possible to set the number of the light emitting diodes LEDR, LEDG, LEDB which are accommodated in the inside of each cylindrical light guide body GLB to a rate of red(R):green (G):blue(B)=1:2:2.

In view of these constitutional examples, as the constitution of each cylindrical light guide body block GLBB, various combinations can be adopted by taking one or more diodes from the light emitting diodes LEDR, LEDG, LEDB that are capable of emitting lights of respective colors. That is, by constituting the cylindrical light guide body block GLBB using the light emitting diodes LEDR, LEDG, LEDB that are capable of emitting lights of three colors, which constitute a minimum unit for performing the color mixing of lights emitted from the light emitting diodes LEDR, LEDG, LEDB, and the cylindrical light guide body GLB, which surrounds the light emitting diodes LEDR, LEDG, LEDB, it is possible to perform color mixing of the irradiated lights of three colors in the inside of the light guide body GLB, whereby the uniformity of chromaticity can be enhanced.

Embodiment 2

Figure 5:
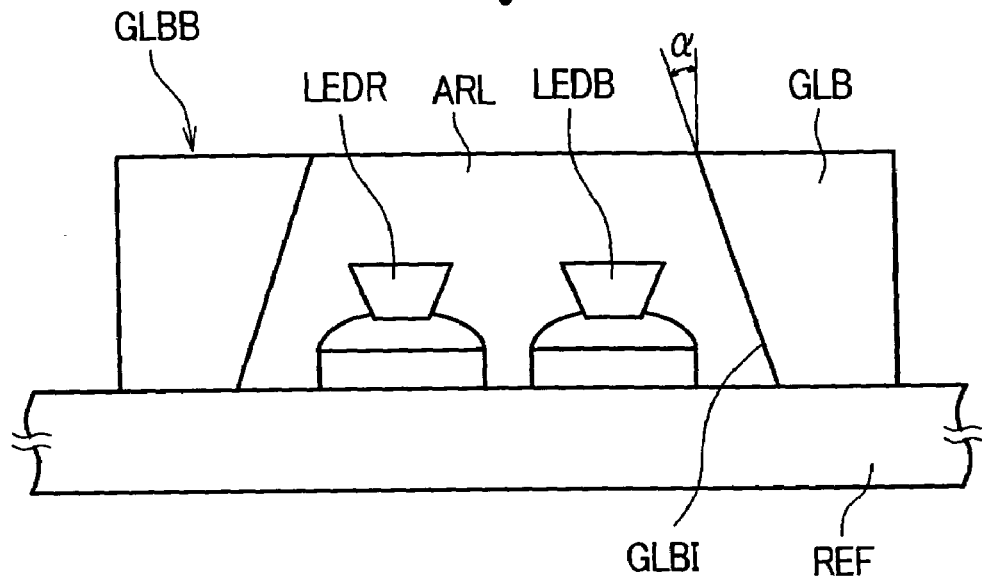
FIG. 5 is an enlarged cross-sectional view showing the constitution of an embodiment 2 of the backlight device according to the present invention.

FIG. 5 is an enlarged cross-sectional view of a light guide body block GLBB representing a second embodiment of the backlight device according to the present invention. In the drawing, parts identical to the parts shown in the above-mentioned FIG. 2B are given the same symbols, and a repeated explanation of these parts is omitted. A constitutional feature which makes the constitution shown in FIG. 5 different from the constitution shown in FIG. 2B lies in the fact that a light incident surface GLBI, which is constituted of an inclined surface having an inclination angle α=10°, which increases in opening diameter in the direction toward a reflector REF side, is formed on an inner wall surface of the light guide body GLB, which is formed in a cylindrical shape using a light-transmitting acrylic resin material.

The shape of the light incident surface GLBI of the cylindrical light guide body GLB, which allows the irradiated light from the light emitting diode LED to be incident thereon, is an important factor which influences the optical path length of light which propagates in the inside of the light guide body GLB. In view of the fact that the light irradiation pattern of the light emitting diode LED exhibits a peak intensity of light at the irradiation angle θ=±80°, as shown in FIG. 12, when the inclination angle a in the inner wall surface of the light guide body GLB is set to 10° and an incident angle θ of the irradiated light from the light emitting diode LED is set to 0°, an optical path length is calculated with respect to an irradiation angle of a peak value and a half-value width. To compare the calculated optical path length with the calculated optical path length when the inclination angle is not formed (inclination angle=θ), as shown in the following Table 1, it is possible to increase the optical path length in the light guide body GLB. Accordingly, it is possible to largely enhance the light utilizing efficiency of the irradiated light which is irradiated from the light emitting diode LED, and, hence, the uniformity of chromaticity can be further enhanced.

TABLE 1

| | LED irradiation angle θ (°) | Incident angle of light guide body α (°) | Optical path length | Total optical path length |
|---|---|---|---|---|
| No inclined angle given to incident surface of light guide body | 60 | −10 | 0.993 | 1.000 |
| | 80 | 10 | 1.000 | |
| | 100 | 30 | 1.054 | |
| Inclined angle of α = 10° given to incident surface of light guide body | 60 | −20 | 1.020 | 1.003 |
| | 80 | 0 | 1.009 | |
| | 100 | 20 | 1.020 | |

Here, in this embodiment, although an explanation has been made with respect to a case in which the light incident surface GLBI, which is formed on the inner surface of the light guide body GLB, is formed as an inclined surface, the opening diameter of which increases in the direction toward the reflector REF side, the light incident surface GLBI may be formed in a reversed manner. That is, even when the light incident surface GLBI is formed of an inclined surface which has an opening, the diameter of which increases in the direction toward the optical compensation sheet stacked body OPS side, it is possible to elongate the optical path length in the inside of the light guide body GLB, and, hence, the uniformity of chromaticity can be further enhanced.

Embodiment 3

Figure 6:
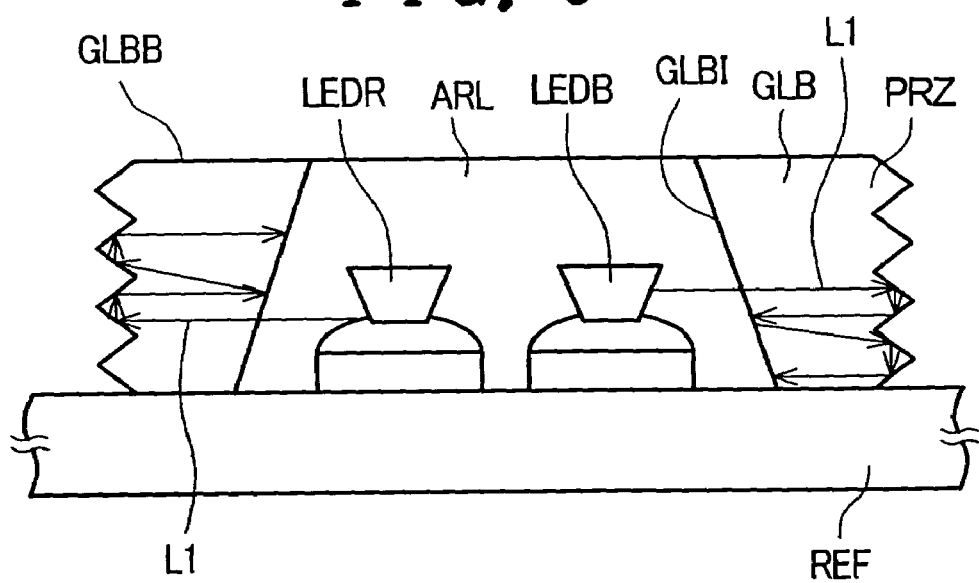
FIG. 6 is an enlarged cross-sectional view showing a constitutional example of an embodiment 3 of the backlight device according to the present invention.

FIG. 6 is an enlarged cross-sectional view of a light guide body block GLBB showing the constitution of an embodiment 3 of the backlight device according to the present invention. In the drawing, parts identical to the parts shown in the above-mentioned FIG. 5 are given the same symbols, and a repeated explanation of these parts is omitted. A constitutional feature which makes the constitution shown in FIG. 6 different from the constitution shown in FIG. 5 lies in the fact that, the light guide body block GLB is constituted in a state such that, for example, prisms PRZ are integrally formed on an outer wall surface of the light guide body GLB, which is formed in a cylindrical shape using a light-transmitting acrylic resin material, to operate as optical control elements having an approximately triangular cross section.

With such a constitution, when the light L1 which passes through the inside of the light guide body GLB impinges on the outer wall surface at an angle which exceeds approximately 42.2°, which is a critical angle, the light beam is made to return to the inside of the light guide body GLB at least once. Accordingly, it is possible to further elongate the optical path length, and, hence, the uniformity in chromaticity can be further enhanced.

Embodiment 4

Figure 7A:
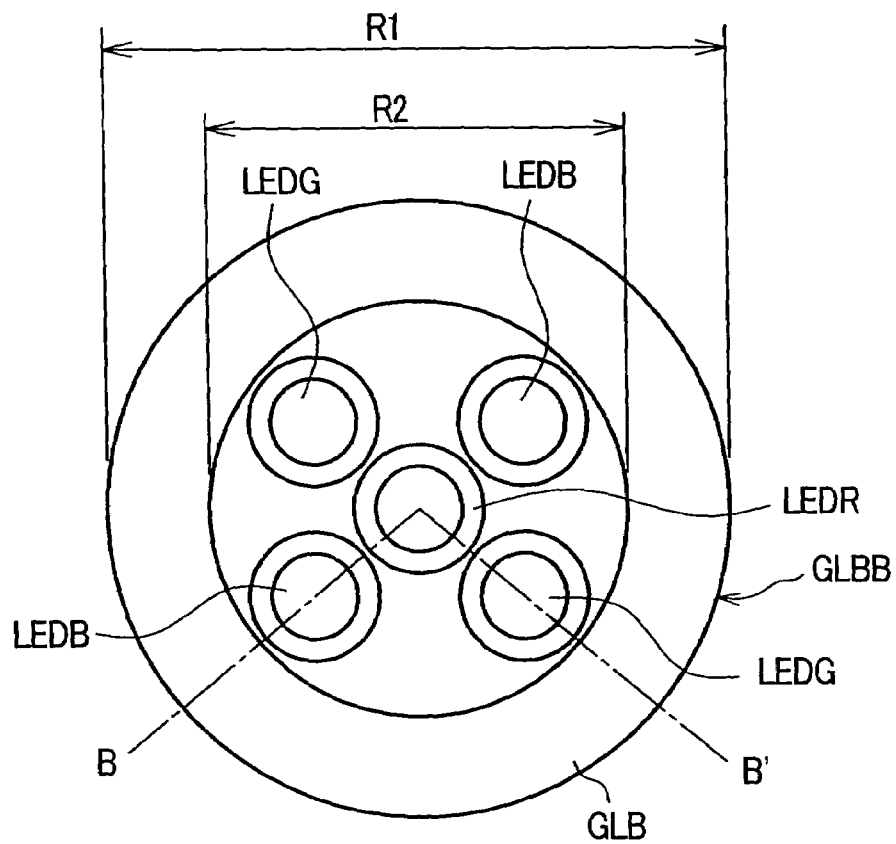
Figure 7B:
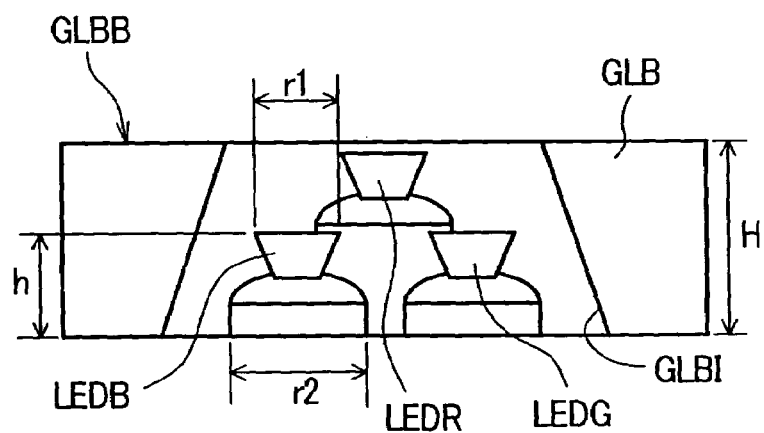

FIG. 7A and FIG. 7B are views showing a light guide body block GLBB representing an embodiment 4 of the backlight device according to the present invention, wherein FIG. 7A is a plan view and FIG. 7B is a cross-sectional view taken along a line B-B' in FIG. 7A. Here, the reflector is omitted from the drawings. A feature which makes the constitution shown in FIG. 7A and FIG. 7B different from the constitution shown in FIG. 6 lies in the fact that a plurality of light emitting diodes LEDR, LEDG, LEDB capable of emitting lights of respective colors are arranged in the inside of the cylindrical light guide body GLB, and, at the same time, the light emitting diode LED which is capable of emitting red light, which has a large height, is arranged at a center portion, and a plurality of light emitting diodes LEDG which are capable of emitting the green light and a plurality of light emitting diodes LEDB which are capable of emitting the blue light, which have heights smaller than the height of the light emitting diode LEDR for emitting red light, are alternately arranged around the light emitting diode LEDR, thus constituting the light guide body block GLBB.

Here, as an example of the sizes of the cylindrical light guide body GLB used in this embodiment, the outer diameter R1 is approximately 50 to 100 mm, the inner diameter R2 is approximately 40 to 60 mm, and the height H is approximately 10 to 20 mm. Further, as an example of the sizes of the light emitting diode LEDB which is capable of emitting blue light, and which is arranged in the inside of the cylindrical light guide body GLB, the diameter r1 of a lens portion is approximately 4.4 mm, the diameter r2 of a body portion is approximately 7.4 mm, the height h is approximately 6.3 mm and the pitch is approximately 9 mm to 10 mm. Here, the neighboring light emitting diode LEDG which is capable of emitting green light has substantially the same size as the light emitting diode LEDB which is capable of emitting blue light. The light emitting diode LEDR, which is capable of emitting red light and which is arranged at the center portion, is configured to have a mounting height that is larger than the mounting heights of the other light emitting diodes LEDG that are capable of emitting green light and the other light emitting diodes LEDB that are capable of emitting blue light.

In such a constitution, the light emitting diode LEDR which is capable of emitting red light, as well as the light emitting diodes LEDG that are capable of emitting green light and the light emitting diodes LEDB that are capable of emitting blue light, are arranged in the inside of the cylindrical light guide body GLB in a state such that their heights differ between the center portion and the peripheral portion.

Accordingly, it is possible to eliminate the possibility that the irradiated light of the light emitting diode LEDR at the center portion impinges on the light emitting diodes LEDG and the light emitting diodes LEDB at the peripheral portion, so that a portion of the light quantity of the irradiated light is absorbed. That is, it is surely possible to obviate the generation of a phenomenon in which the irradiated light of the light emitting diode LEDR that is capable of emitting red light at the center portion is absorbed by the neighboring light emitting diodes LEDG that are capable of emitting green light and the neighboring light emitting diodes LEDB that are capable of emitting blue light at the peripheral portion. Due to such a constitution, it is possible to further enhance the light utilizing efficiency.

Further, by arranging the light emitting diodes LEDG and the light emitting diodes LEDB at the peripheral portion in a state such that their mounting heights differ from each other in a random manner in the circumferential direction, the probability that the irradiated lights of respective colors impinge each other can be further reduced, and, hence, the light utilizing efficiency is further enhanced.

Here, in a description of the above-mentioned embodiments, explanation has been made with respect to a case in which the plurality of light guide body blocks GLBB are arranged with regularity so as to be arranged in a lateral-and-longitudinal matrix array of 5 columns×4 lines on the reflection REF. However, it is needless to say that the invention is not limited to such a regular arrangement, and it is possible to obtain advantageous effects which are exactly as same as the above-mentioned advantageous effects by arranging the light guide body blocks in a random and uniformly distributed manner on the reflector, while preventing a gathering of the light guide body blocks.

Further, in the above-mentioned description of the respective embodiments, an explanation has been made with respect to a case in which the shape of the light-transmitting light guide body GLB is formed so as to be cylindrical. However, it is needless to say that the shape of the light-transmitting light guide body GLB is not limited to such a cylindrical shape, and it is possible to obtain advantageous effects exactly the same as the above-mentioned advantageous effects by forming the light-transmitting light guide body GLB to have an elliptical shape or a polygonal shape.

Figure 8:
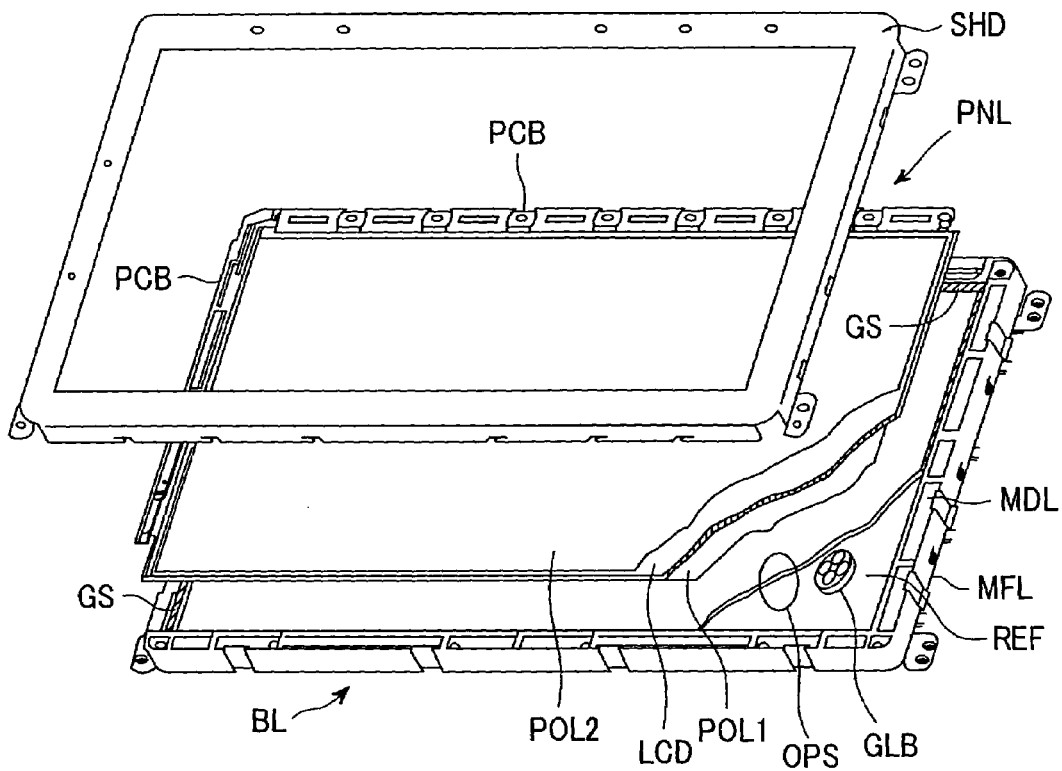
FIG. 8 is a developed perspective view showing one example of the overall constitution of a liquid crystal display device representing the display device according to the present invention.

FIG. 8 is a developed perspective view showing an overall constitutional example of the display device according to the present invention. In FIG. 8, the liquid crystal display panel PNL has drive circuits mounted on a periphery (an upper side and a lower side in this embodiment) of a liquid crystal display cell LCD, and it includes a printed circuit board PCB which supplies signals to these drive circuits. Further, polarizers POL1, POL2 are stacked on front and back surfaces of the liquid crystal display cell LCD, respectively. Further, the backlight device BL, which is mounted on a back surface of the liquid crystal display panel PNL, includes a mold frame MDL which accommodates the reflector REF on which the above-mentioned plurality of light guide body blocks GLBB and the like are mounted. Here, the backlight device BL is supported on the mold frame MDL. Further, above the light guide body blocks GLBB, the optical compensation sheet stacked body OPS, consisting of two sets of prism sheets and diffusion sheets, is mounted.

In this constitutional example, the backlight device BL in each embodiment described heretofore is mounted using shape elastic members GS, which are arranged on an inner peripheral portion of the mold MDL. The liquid crystal display panel PNL is mounted on the backlight device BL by way of these shape elastic members GS, the liquid crystal display panel PNL is covered with an upper frame SHD from above, and the upper frame SHD is integrally formed with a lower frame MFL by connection.

In the display device having such a constitution, the liquid crystal display panel PNL is illuminated with white light having a uniform luminous flux distribution that is irradiated from the backlight device BL, which is constituted of the light guide body blocks which accommodate the light emitting diodes of at least three colors in the inside of a plurality of light guide bodies, which are formed as a light transmitting cylindrical body, and which are arranged in a uniformly scattered manner on a reflector having a light reflection surface formed on the surface, as has been explained in connection with the above-mentioned respective embodiments, whereby electronic latent images which are formed on the liquid crystal display panel PNL are visualized.

Figure 9:
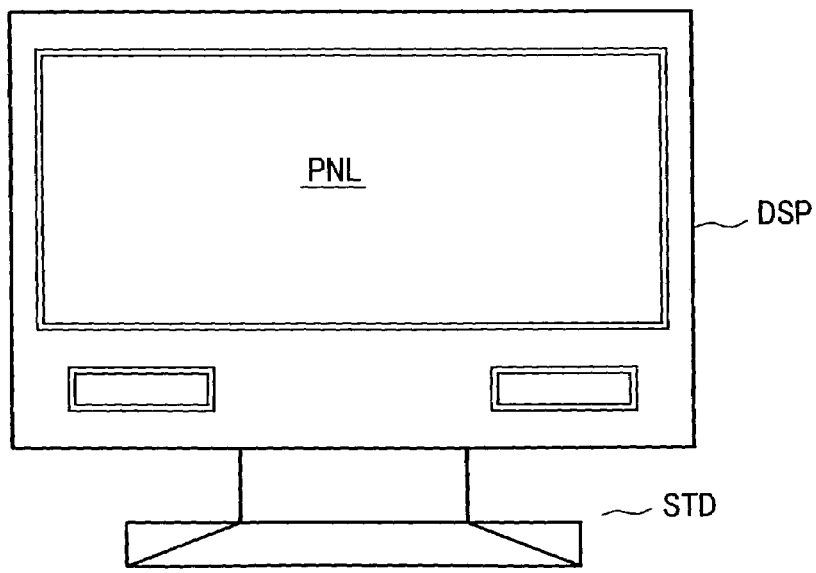
FIG. 9 is a diagram showing the appearance of a television receiver set which constitutes an example of electronic equipment in which there is a liquid crystal display module which uses the liquid crystal display device of the present invention.
Figure 10:
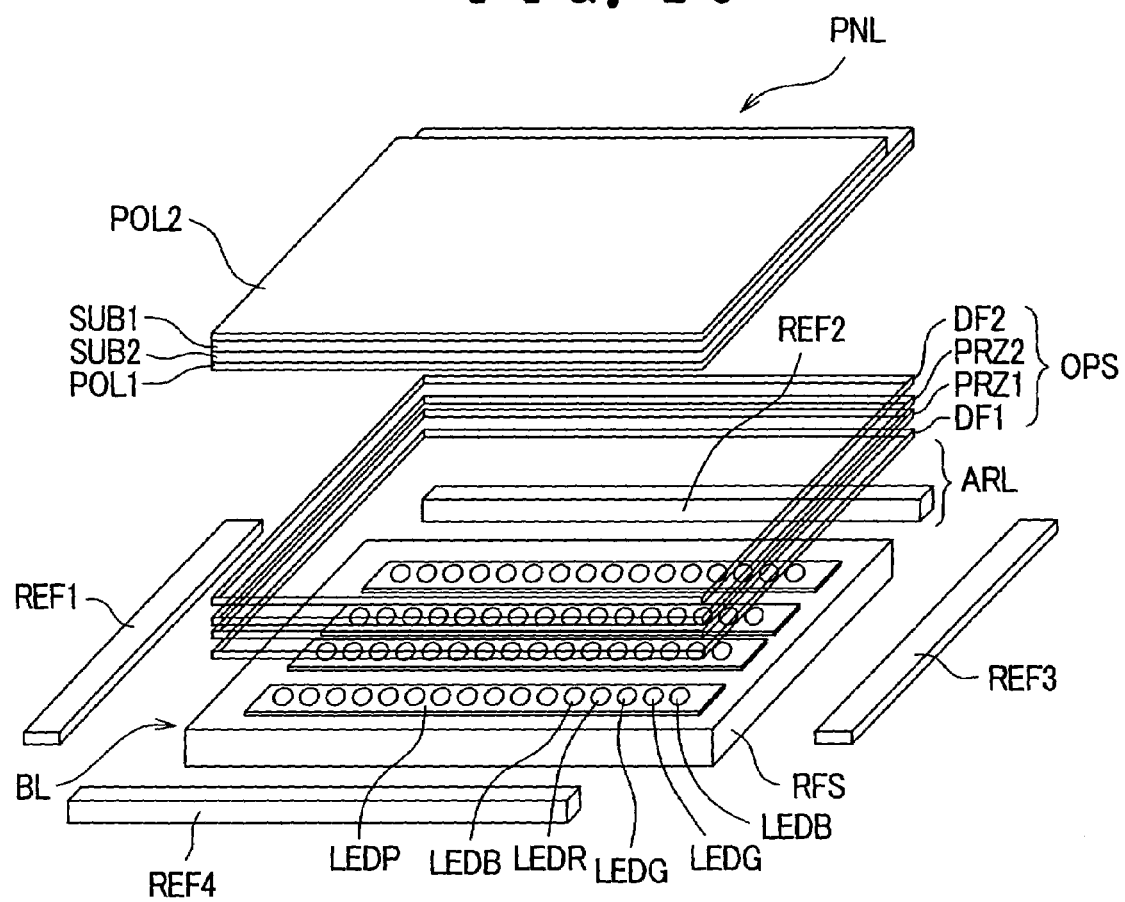
FIG. 10 is a developed perspective view showing the constitution of the liquid crystal display device having a currently-available backlight device.
Figure 11:
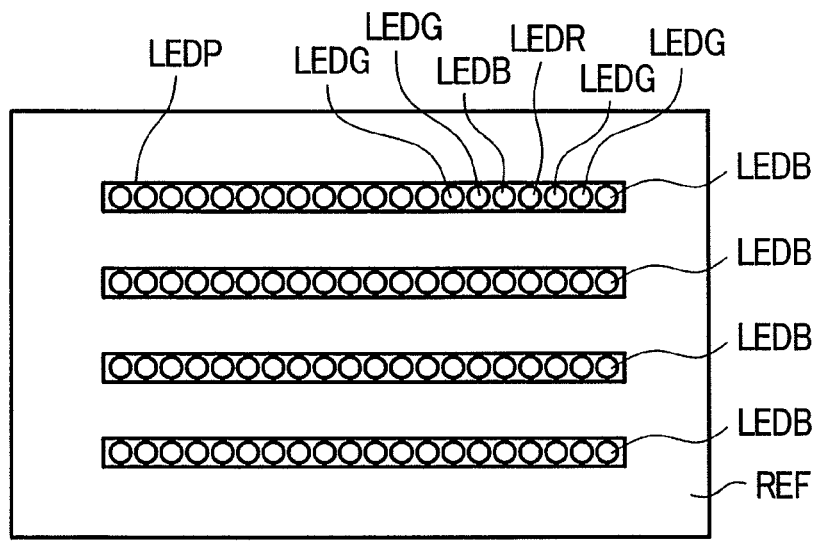
FIG. 11 is a plan view showing a portion of the constitution of the backlight device shown in FIG. 10.

FIG. 9 shows the outer appearance of a television receiver set which constitutes one example of electronic equipment in which the liquid crystal display module of the present invention is mounted. In FIG. 9, the television receiver set is constituted of a display part DSP and a stand part STD; and, the liquid crystal display device, which includes the liquid crystal display panel PNL having a relatively large-sized screen, is mounted on the display part DSP. An effective display region of the liquid crystal display panel PNL, which constitutes a screen of the liquid crystal display device is exposed on the display part DSP. By mounting the backlight device according to the present invention on the display part DSP of the television receiver set, it is possible to realize an image display device of high quality and high reliability which exhibits a high color reproducibility.

In the description of the above-mentioned embodiments, an explanation has been given with respect to a case in which the present invention is applied to a large-sized liquid crystal television receiver set on which a liquid crystal display module using a liquid crystal display device having a solid-state light-emitting-element direct backlight device is mounted. However, it is possible to obtain substantially the same advantageous effects by applying the present invention to other display devices, such as a large-sized liquid crystal monitor, a vehicle-mounted liquid crystal display device (a liquid crystal car navigation set), a mobile phone display device, a liquid crystal display device for a game, a liquid crystal monitor for medical use, a liquid crystal monitor for printing/designing or the like.

What is claimed is:

1. A display device comprising:
   a liquid crystal display panel which includes electrodes for forming pixels on an inner surface thereof and interposes a liquid crystal layer between a pair of transparent substrates; and
   a backlight device which includes:
   an optical compensation sheet stacked body which is mounted on a back surface of the liquid crystal display panel;
   a light reflection plate which includes a light reflection surface; and
   a plurality of solid-state light emitting element units capable of emitting lights of at least three colors mounted on the light reflection surface of the light reflection plate;
   wherein each of the plurality of solid-state light emitting element units includes an outer surface of a light-transmitting cylindrical light guide body; and
   wherein air is filled inside of the light-transmitting cylindrical light guide body of the solid-state light emitting unit and outside of the light-transmitting cylindrical light guide body so that the air is also provided between the light-transmitting cylindrical light guide bodies of the plurality of solid-state light emitting units.

2. A display device according to claim 1, wherein each of the solid-state light emitting element units includes a red solid-state light emitting element, a green solid-state light emitting element, a blue solid-state light emitting element, and an inner surface of the light-transmitting cylindrical light guide body surrounds and is spaced from the red, green and blue solid-state light elements of the solid-state light emitting element unit by the air;

wherein each of the solid-state light emitting elements is formed of a side-emitter-type solid-state light emitting element capable of emitting light in a sideways direction; and wherein an optical intensity of the side-emitting solid-state light emitting element assumes a peak value when an irradiation angle θ of the light becomes θ=approximately ±80° and an angle θ which halves the optical intensity is ±20°.

3. A display device according to claim 2, wherein at least one of the solid-state light emitting elements of the solid-state light emitting element units has a different height from other solid-state light emitting elements of the solid-state light emitting element units.

4. A display device according to claim 2, wherein each light-transmitting cylindrical light guide body includes a light incident surface which is inclined relative to a center axis on an inner wall surface of the light-transmitting cylindrical light guide body.

5. A display device according to claim 2, wherein each light-transmitting cylindrical light guide body integrally includes optical control elements on a cylindrical outer wall surface of the light-transmitting cylindrical light guide body.

6. A display device according to claim 2, wherein the plurality of solid-state light emitting element units are mounted on the light reflection surface of the light reflection plate in a uniformly dispersed manner.

7. A backlight device according to claim 1, wherein each of the solid-state light emitting element units includes a plurality of solid-state light emitting elements capable of emitting light of different colors surrounded by the light transmitting cylindrical light guide body.

8. A display device comprising:
a display panel which performs an image display; and
a backlight device which is mounted on a back surface of the display panel, wherein
the backlight device includes:
a light reflection plate which includes a light reflection surface; and
a plurality of solid-state light emitting element units mounted on the light reflection surface of the light reflection plate;
wherein each of the solid-state light emitting element units includes a red solid-state light emitting element, a green solid-state light emitting element and a blue solid-state light emitting element;
wherein each of the plurality of solid-state light emitting element units includes an outer surface of a light-transmitting cylindrical light guide body surrounding the solid-state light emitting elements therein; and
wherein air is filled inside of the light-transmitting cylindrical light guide body of the solid-state light emitting element unit so that the air is provided between the solid-state light emitting elements and the light transmitting cylindrical light guide body and outside of the light transmitting cylindrical light guide body so that the air is also provided between the light-transmitting cylindrical light guide bodies of the plurality of solid-state light emitting units.

9. A display device according to claim 8, wherein each of the solid-state light emitting elements is formed of a side-emitter-type solid-state light emitting element capable of emitting light in a sideways direction;

wherein an optical intensity of the side-emitting solid-state light emitting assumes a peak value when an irradiation angle θ of the light becomes θ=approximately ±80° and an angle θ which halves the optical intensity is ±20°.

10. A display device according to claim 9, wherein at least one of the solid-state light emitting elements of the solid-state light emitting element units has different height from other solid-state light-emitting elements.

11. A display device according to claim 8, wherein each light-transmitting cylindrical light guide body includes a light incident surface which is inclined relative to a center axis on an inner wall surface of the light-transmitting cylindrical light guide body.

12. A display device according to claim 8, wherein each light-transmitting cylindrical light guide body includes optical control elements on a cylindrical outer wall surface of the light-transmitting cylindrical light guide body.

13. A display device according to claim 8, wherein the plurality of solid-state light emitting element units are mounted on the light reflection surface of the light reflection plate in a uniformly dispersed manner.

14. A backlight device comprising:
a light reflection plate which includes a light reflection surface; and
a plurality of solid-state light emitting element units mounted on the light reflection surface of the light reflection plate;
wherein each of the plurality of solid-state light emitting element units includes at least two solid-state light emitting elements emitting light of different colors, and an outer surface of a light-transmitting cylindrical light guide body; and
wherein air is filled inside of the light-transmitting cylindrical light guide body of the solid-state light emitting unit so that air is provided between the solid state light emitting elements and the light transmitting cylindrical light guide body and outside of the light-transmitting cylindrical light guide body so that the air is also provided between the light-transmitting cylindrical light guide bodies of the plurality of solid-state light emitting units.

15. A backlight device according to claim 14,
wherein each of the solid-state light emitting element units includes a red solid-state light emitting element, a green solid-state light emitting element and a blue solid-state light emitting element;
wherein each of the solid-state light emitting elements is formed of a side-emitter-type solid-state light emitting element capable of emitting light in a sideways direction;
wherein an optical intensity of the side-emitter solid-state light emitting element assumes a peak value when an irradiation angle θ of the light becomes θ=approximately ±80° and an angle θ which halves the optical intensity is ±20°.

16. A backlight device according to claim 15, wherein at least one of the solid-state light emitting elements of the solid-state light emitting element unit has different height from other solid-state light emitting elements of the solid-state light-emitting element unit.

17. A backlight device according to claim 14, wherein each light-transmitting cylindrical light guide body includes light incident surface which is inclined relative to a center axis on an inner wall surface of the light-emitting cylindrical light guide body.

18. A backlight device according to claim 14, wherein each light-transmitting cylindrical light guide body integrally includes optical control elements on a cylindrical outer wall surface of the light-transmitting cylindrical light guide body.

19. A backlight device according to claim 14, wherein the plurality of solid-state light emitting element units are mounted on the light reflection surface of the light reflection plate in a uniformly dispersed manner.

20. A backlight device according to claim 14, wherein each of the solid-state light emitting element units includes a plurality of solid-state light emitting elements emitting light of three different colors surrounded by the light transmitting cylindrical body.

* * * * *